United States Patent [19]
Allen

[11] Patent Number: 5,434,975
[45] Date of Patent: Jul. 18, 1995

[54] SYSTEM FOR INTERCONNECTING A SYNCHRONOUS PATH HAVING SEMAPHORES AND AN ASYNCHRONOUS PATH HAVING MESSAGE QUEUING FOR INTERPROCESS COMMUNICATIONS

[75] Inventor: James R. Allen, Naperville, Ill.

[73] Assignee: AT&T Corp., Murray Hill, N.J.

[21] Appl. No.: 951,488

[22] Filed: Sep. 24, 1992

[51] Int. Cl.$^6$ .................. G06F 13/376; G06F 13/14; G06F 13/00; G06F 3/00

[52] U.S. Cl. .................. 395/200; 395/250; 395/650; 395/325; 364/927.96; 364/927.99; 364/919; 364/269; 364/270.5; 364/242.94; 364/229; 364/222.2; 364/271

[58] Field of Search .............. 395/200, 500, 550, 275, 395/250, 325, 650

[56] References Cited

U.S. PATENT DOCUMENTS

| | | | |
|---|---|---|---|
| 4,325,120 | 4/1982 | Colley et al. | 364/200 |
| 4,379,327 | 4/1983 | Tietjen et al. | 364/200 |
| 4,390,969 | 6/1983 | Hayes | 364/900 |
| 4,402,046 | 8/1983 | Cox et al. | 364/200 |
| 4,694,396 | 5/1985 | Weisshaar et al. | 364/300 |
| 4,897,779 | 1/1990 | Dickson et al. | 364/200 |
| 5,040,109 | 8/1991 | Bowhill et al. | 364/200 |
| 5,086,498 | 2/1992 | Tanaka et al. | 395/200 |
| 5,179,705 | 1/1993 | Kent | 395/725 |
| 5,191,657 | 3/1993 | Ludwig et al. | 395/325 |
| 5,263,150 | 11/1993 | Fan | 395/550 |
| 5,276,814 | 1/1994 | Bourke et al. | 395/275 |

OTHER PUBLICATIONS

Tait, Peter, *Message Passing Holds The Key To Distributed Computing*, Computer Technology Review, vol. 11, No. 6, May 1991, pp. 23-27.

Dinning, Anne, *A Survey of Synchronization Methods for Parallel Computers*, Computer, vol. 22, No. 7, Jul. 1989, pp. 66-77.

P. J. Courtois, et al., *Concurrent Control with "Readers" and Writers*, Communications of the Association for Computing Machinery, vol. 14, No. 10, Oct. 1971, pp. 667-668.

M. E. Grzelakowski et al., "The 3B20D Processor & DMERT Operating System: DMERT Operating System", The Bell System Technical Journal, vol. 62, No. 1, Jan. 1983, pp. 303-322.

M. J. Bach, "The Design of the UNIX TM Operating System", (1986), pp. 111-118, 199-212, 325-352, and 355-411.

Primary Examiner—Thomas C. Lee
Assistant Examiner—Felicia Ives
Attorney, Agent, or Firm—David Volejnicek

[57] ABSTRACT

To overcome the lack of support in time-sharing and uniprocessor operating systems such as the UNIX® operating system for real-time and multiprocessor applications, there is provided an asynchronous inter-process communications capability that can be grafted onto the operating systems. Communicating processes (100, 103) communicate via datagram messages through logical asynchronous inter-process communications links (110) each having a synchronous segment (101) and an asynchronous segment (102). The links include a message-serving hub process (11) that communicates in a synchronous, buffer (302) and semaphore (300)-based, manner with processes (100) that are message senders, and communicates in an asynchronous, queue (602) and signals (600)-based, manner with processes (103) that are message destinations. The hub process may be implemented at any process level of the operating system.

12 Claims, 5 Drawing Sheets

SYSTEM FOR INTERCONNECTING A SYNCHRONOUS PATH HAVING SEMAPHORES AND AN ASYNCHRONOUS PATH HAVING MESSAGE QUEUING FOR INTERPROCESS COMMUNICATIONS

TECHNICAL FIELD

This invention relates generally to computer operating systems, and relates specifically to inter-process communication arrangements of operating systems.

BACKGROUND OF THE INVENTION

Inter-process communication arrangements of computer operating systems come in two basic varieties: synchronous and asynchronous. Synchronous inter-process communications are those that require a common occurrence, such as common timing, a predefined relationship, or in-step operation, in order for two or more processes to communicate. Conversely, asynchronous inter-process communications are those that occur without a regular or predictable time relationship or correlation between the communicating processes. Another way of viewing the difference between synchronous and asynchronous inter-process communications is that synchronous communications require the transmitting process to coordinate its transmissions in time with reception by the receiving process or processes, whereas asynchronous communications allow the transmitting and receiving processes to transmit and receive independently in time of each other's operations.

On one hand, operating systems designed to support uniprocessor timesharing operations, such as the UNIX® operating system, generally implement synchronous inter-process communications. On the other hand, multiprocessor and real-time operations typically require asynchronous inter-process communications for their support. Synchronous communications arrangements are generally difficult to use with a multiplicity of processes and too prone to deadlock to provide effective support for multiprocessor and real-time operations.

Unfortunately, this requirement undesirably limits the uses for popular operating systems, such as the UNIX system, that do not provide effective asynchronous inter-process communications capabilities. The advantages of such popular operating systems include a large supply of designers experienced in their use, who may be readily drawn upon to staff new projects and to get these projects substantively under way beyond the initial start-up, learning, curve. The advantages further include a large body of existing programs that may be drawn upon as a library and that may be re-used in new projects without having to be designed anew.

Of course, conventional operating systems often may be redesigned to support real-time or multiprocessor operations and to include asynchronous inter-process communications mechanisms. But conventionally, such redesign effectively results in a new operating system that destroys the above-enumerated advantages of the system on which it is based. An illustrative example of such a redesigned operating system is the UNIX-RTR operating system, which is a UNIX-based system that supports real-time applications such as telephone switching.

Consequently, what the art requires is an asynchronous inter-process communications mechanism that can be grafted onto an operating system, such as the UNIX system, without adversely affecting any of its conventional interfaces and operational characteristics. However, the standard operating system facilities provided by the UNIX operating system and its clones and derivatives make this difficult to achieve. The operating systems' inter-process-related system calls (e.g., shared memory, semaphores, inter-process messages and signals) are synchronous in nature and do not lend themselves to the support of asynchronous communication schemes. In addition the UNIX-type operating systems do not normally provide a facility for inhibiting process switches. This creates the possibility of multiple processes accessing shared memory simultaneously, thereby greatly limiting the usefulness of shared memory.

SUMMARY OF THE INVENTION

This invention is directed to solving the problems and meeting the needs of the prior art. According to the invention, there is provided an asynchronous inter-process communications arrangement that may be grafted onto an operating system (for example, onto the UNIX operating system) in order to overcome the limited support for real-time and multiprocessor applications. The asynchronous inter-process communications arrangement comprises a synchronous communications path segment for communicating with a first process, such as the message-sending process, of a pair of communicating processes within a single processor, an asynchronous communications path segment for communicating with a second process of the pair, and an arrangement, such as a procedure, for interconnecting the synchronous and the asynchronous communications path segments to form a communications path extending between the processes of the pair.

Illustratively, the synchronous segment is semaphore-based. It utilizes a buffer implemented in shared memory and shared by the plurality of message-sending processes. Access to the buffer by the sending processes and the interconnecting procedure is serialized by a semaphore having three states or values. Also illustratively, the asynchronous segment is buffer-based. It utilizes circular buffers implemented in shared memory, a different one for each message-receiving process. A write pointer to each buffer is controlled by the interconnecting procedure, while a read pointer to each buffer is controlled by the corresponding message receiving process. The procedure notifies message-receiving processes of presence of a message via a signals facility.

As required by the art, the invention provides an asynchronous inter-process communications mechanism that can be grafted onto an operating system without adversely affecting any of the operating system's conventional interfaces and operational characteristics. It thus provides support for both real-time and multiprocessor applications without destroying existing characteristics, features or advantages of the existing operating system. It is simple to implement; illustratively, it is implementable as just another process. Furthermore, it may be incorporated into any process level of the operating system.

These and other advantages and features of the invention will become apparent from the following description of an illustrative embodiment of the invention taken together with the drawing.

DETAILED DESCRIPTION

Figure 1:
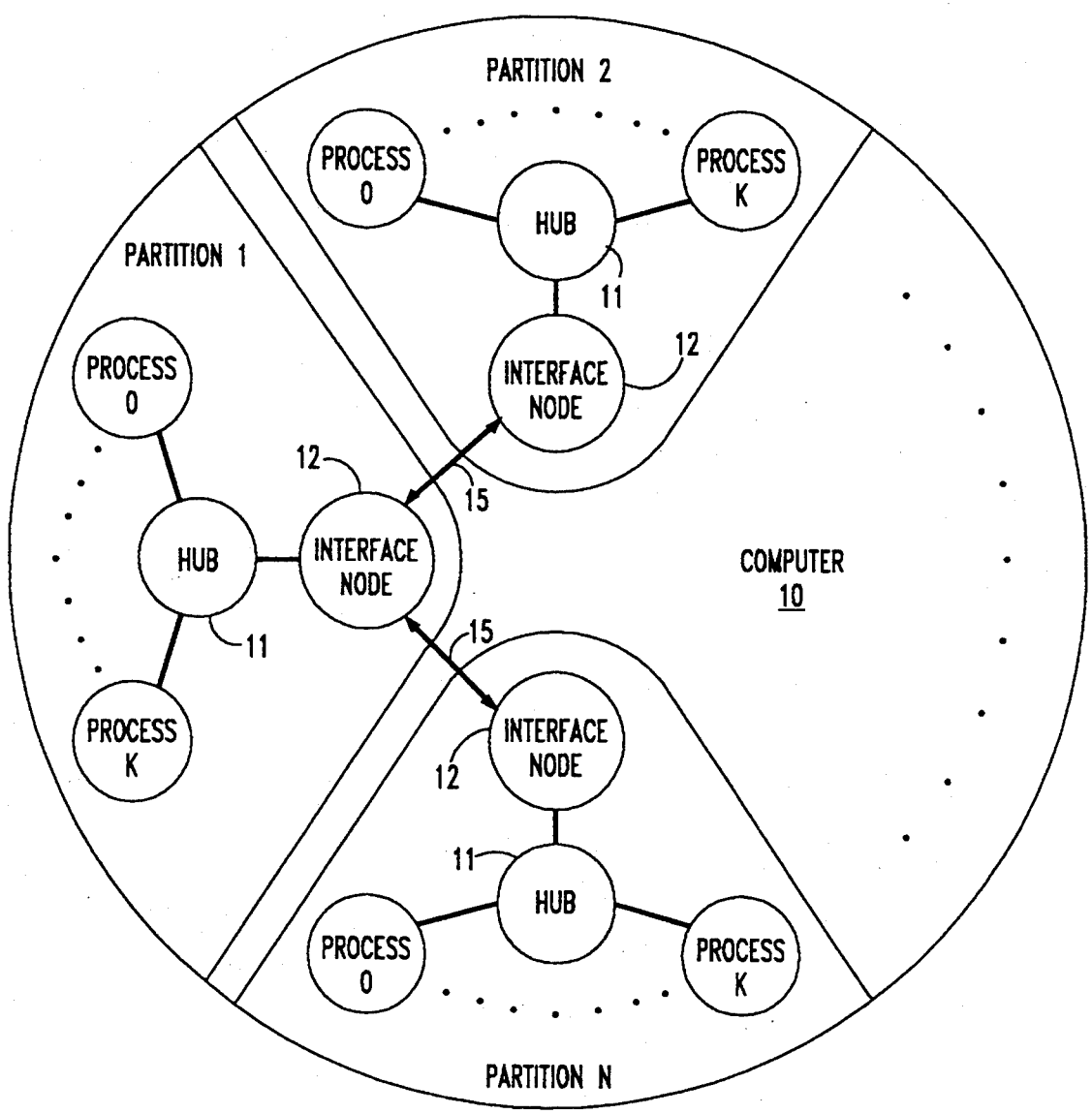
FIG. 1 is a logical diagram of a computer that incorporates an illustrative embodiment of the invention.

FIG. 1 is a logical diagram of a computer 10. Computer 10 comprises one or more partitions 1-N. Computer 10 may be a multiprocessor system wherein each partition 1-N represents a separate processor. Or, computer 10 may be a uniprocessor system wherein partitions 1-N are merely logical groupings of functions or processes of the system. For a uniprocessor system 10, computer need not be partitioned, i.e., it may consist of only a single partition.

Each partition 1-N includes a plurality of conventional processes 0-K, where the value of K may differ from partition to partition. Processes 0-K in a single partition 1-N may communicate with each other and with processes in other partitions 1-N through conventional inter-process communication arrangements provided by the operating system of their individual partition 1-N. Therefore, all existing functionality is preserved. Illustratively, either each partition 1-N executes its own copy of the UNIX operating system, or all partitions 1-N execute a common copy of the operating system, as is conventional.

According to the invention, each partition 1-N further includes a hub function 11 that provides asynchronous inter-process communications capability among processes 0-K of that partition 1-N, and provides such capability between processes 0-K of that partition and the processes 0-K of the other partitions 1-N through associated one or more interface nodes 12. The interface nodes 12 are directly interconnected by communication paths 15. Illustratively, each path 15 is a conventional communication mechanism, such as a TCP/IP-protocol link on an Ethernet® LAN, or a serial point-to-point modem connection. Illustratively, each interface node 12 is implemented as a process in the corresponding partition 1-N. Implementation of interface nodes 12 as processes enables hub functions 11 to treat inter-partition communications, that is, communications to and from interface nodes 12, identically to intra-partition communications between processes 0-K.

In each partition 1-N, hub function 11 is also implemented as a process, at any one of the process levels provided by the operating system of that partition 1-N. For example, in the UNIX operating system, hub function 11 may be implemented either as a user-level (application) process, or as a kernel-level process, internal to the operating system. Intermediate or interpreter-level (shell) process implementations may also be envisioned.

Figure 2:
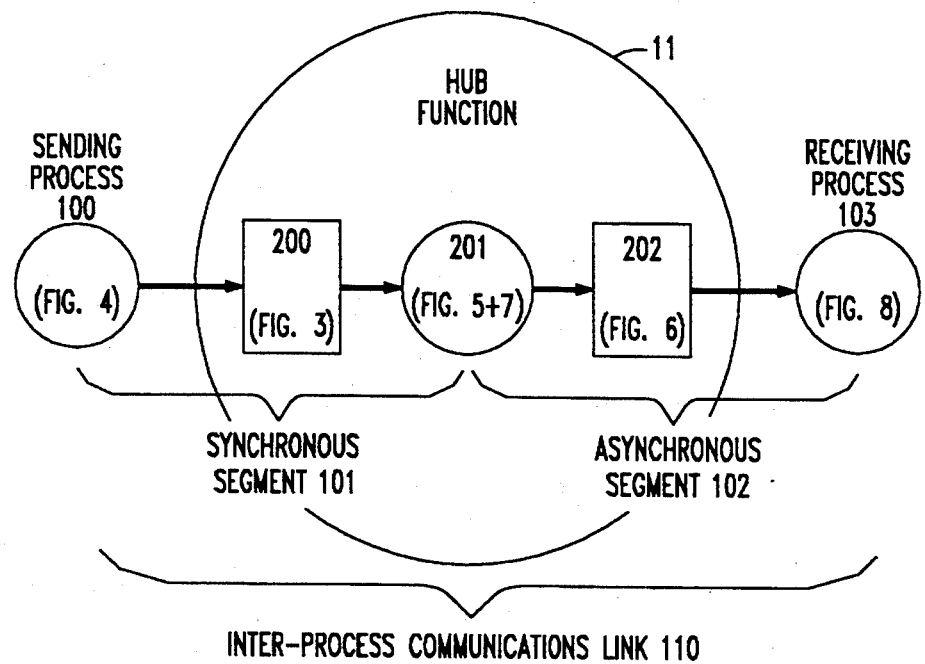
FIG. 2 is a block diagram of an inter-process communications link of the computer of FIG. 1.

As shown in FIG. 2, hub function 11 implements a logical asynchronous inter-process communications path or link 110 between each communication-sending process 100 and a communication-receiving process 103. Processes 100 and 103 are from the set of processes 0-K and interface nodes 12. Each inter-process communications link 110 is made up of two portions' or segments: a synchronous inter-process communications segment 101 between sending process 100 and hub function 11, and an asynchronous inter-process communications segment 102 between hub function 11 and receiving process 103. A single synchronous segment 101 may form a part of a plurality of inter-process communications links 110, such as when sending process 100 is broadcasting to a plurality of receiving processes 103.

Figure 3:
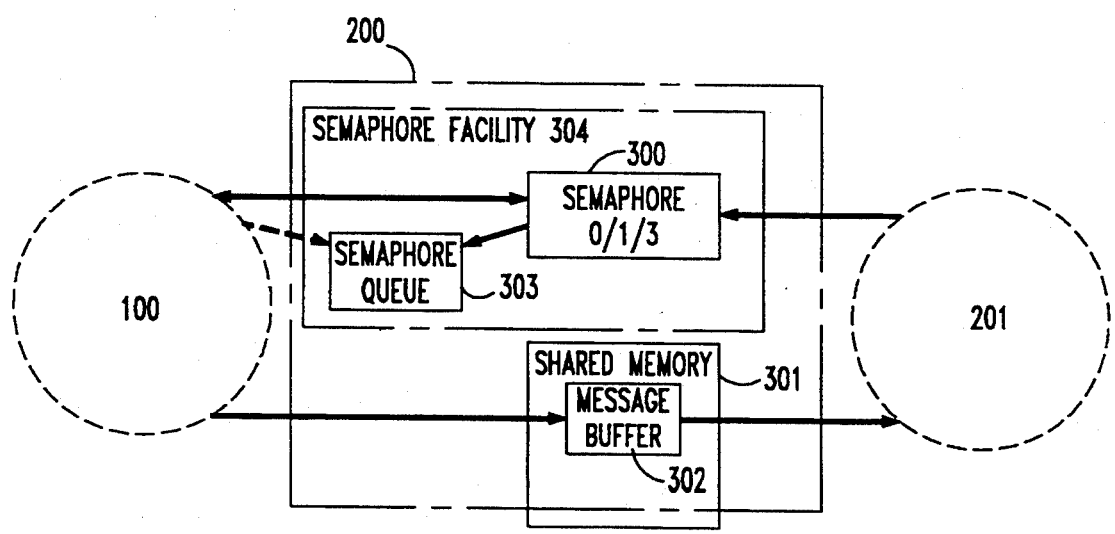
FIG. 3 is a block diagram of synchronous data-structures-and-functions block of a hub function of the link of FIG. 2.

Hub function 11 acts as a message server between sending processes 100 and receiving processes 103. Hub function 11 comprises two sets of data structures and facilities 200 and 202, which are shown in FIGS. 3 and 6, respectively, and a procedure 201 which is diagramed in FIGS. 5 and 7. Synchronous segment 101 is implemented by a procedure of a sending process 100 which is diagramed in FIG. 4, by data structures and facilities 200, and the portion of procedure 201 which is diagramed in FIG. 5. Asynchronous segment 102 is implemented by the portion of procedure 201 which is diagramed in FIG. 7, by data structures and facilities 202, and by a procedure of a receiving process 103 which is diagramed in FIG. 8. Procedure 201 therefore acts as an interface between segments 101 and 102 that joins the two segments together to form link 110.

As shown in FIG. 3, data structures and facilities 200 comprise a message buffer 302 implemented in shared memory 301, and an associated semaphore 300. Shared memory 301 is a mechanism supported by the standard UNIX operating system which allows the plurality of processes 0-K, interface nodes 12, and hub function 11 to map a part of their own address spaces into the same portion 302 of physical memory. Semaphore facility 304 is also a mechanism supported by the standard UNIX operating system which allows a read-modify-write (RMW) sequence of operations to be performed as an atomic operation on a memory location. Semaphore facility 304 includes semaphore 300 and an associated semaphore queue 303. Semaphore 300 takes on three logical states or values: "0", "1", and "3". Semaphore 300 is initialized with a value of "3". As is conventional in the UNIX operating system, any process that attempts to perform an RMW sequence on semaphore 300 that would change the semaphore's value to a negative value is automatically put to sleep by the UNIX operating system on semaphore queue 303, and is awakened by the operating system only when it both (a) reaches the head of queue 303 and (b) execution of its previously-attempted RMW sequence will not change the semaphore's value to a negative value. Semaphore 300 implements what is conventionally referred to as a "critical region" around message buffer 302; it ensures that only one process has access to message buffer 302 at any one time.

Figure 4:
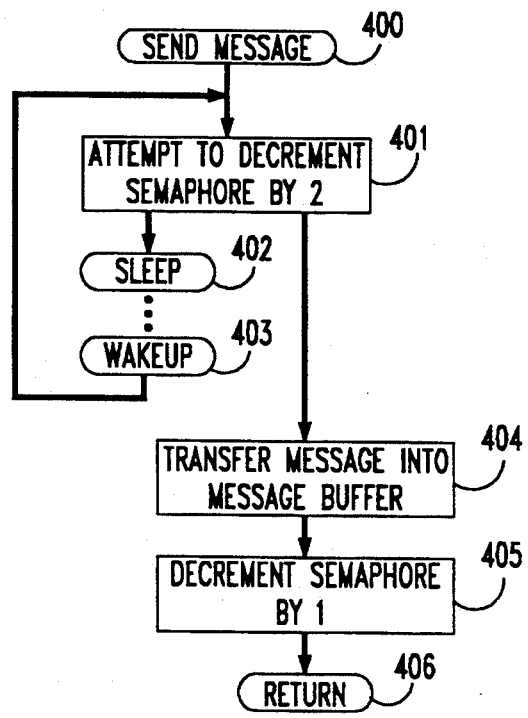
FIG. 4 is a flow diagram of a synchronous procedure of a sending process of the link of FIG. 2.

When a process 0-K or an interface node 12 wishes to communicate with another process 0-K or an interface node 12 by means of an inter-process communications link 110, it executes the procedure of FIG. 4 with respect to the data structures and facilities 200 of FIG. 3 to become sending process 100. Upon its invocation, at step 400, the procedure attempts to perform an RMW sequence that decrements the value of semaphore 300 by two, at step 401. The only time that the attempt at the RMW sequence succeeds is when semaphore 300 has a value of "3", which signifies that message buffer 302 is empty and available for use. If the value of semaphore 300 is "1" or "0", the RMW sequence blocks or suspends because the sequence would reduce the value of semaphore 300 to a negative value, and sending process 100 is put to sleep on queue 303, at step 402. When this sending process 100 reaches the head of queue 303 and semaphore 300 re-acquires a value of "3", sending process 100 is awakened, at step 403, and it returns to step 401 to attempt again the previously-failed RMW sequence.

If and when the RMW sequence of step 401 succeeds, the value of semaphore 300 becomes "1", which signifies that message buffer 302 is in use and being filled. Following its success at step 401, the procedure of FIG. 4 transfers into message buffer 302 whatever message sending process 100 wishes to send, at step 404. Illustratively, the message has the form of a datagram. The message includes an identifier of one or more receiving processes 103 which are intended to receive the message. The procedure then attempts to perform an RMW sequence that decrements the value of semaphore 300 by one, at step 405. Since steps 401 and 405 are always performed in the same order, this attempt never fails except in case of an error. Therefore, the value of semaphore 300 becomes "0" at step 405, which signifies that message buffer 302 is in use and has been filled with a message. Its task is completed, and the procedure of FIG. 4 now returns to the point of its invocation, at step 406.

Procedure 201 of hub function 11 of FIG. 2 starts executing upon initialization of its corresponding partition 1-N. Upon being started, at step 500 of FIG. 5, procedure 201 reads semaphore 300 of FIG. 3, at step 501, to determine if its value is "0", at step 502. If not, it means that a message is not stored in message buffer 302 of FIG. 3, and so procedure 201 merely returns to step 501 to await arrival of a message. Alternatively, to avoid consuming CPU resources, procedure 201 goes to sleep on semaphore 300, in a conventional manner, and is awakened when the value of semaphore 300 becomes "0". If the value of semaphore 300 is "0", it means that a message is stored in message buffer 302, and so procedure 201 retrieves the stored message, at step 503. This frees message buffer 302 for use by another sending process 100. Procedure 201 so indicates by performing an RMW sequence on semaphore 300 that increments the value of semaphore 300 by three, i.e., back to a value of "3". Procedure 201 then advances to step 700 of FIG. 7.

Turning to FIG. 6, data structures and facilities 202 comprise a plurality of circular data queues 602 implemented in shared memory 301, one queue 602 for each process 0-K and interface node 12, i.e., one for each entity that may be a receiving process 103.

The implementation of queues 602 must be sensitive to the fact that the UNIX operating system does not support any mechanism for preventing process switches. Consequently, switches between processes 201 and 103 may occur at any time, including when the running process is in the midst of operating on a queue 602. One way of dealing with this situation is to permit only two reference structures to a queue 602—a read index and a write index—and allow each reference structure to be operated on exclusively by only one of the processes 201 and 103. Also, it must be ensured that all read and write operations on the read and write indexes are atomic operations. For example, on some machines, the read and write indexes must each be limited to a single byte in length. Accordingly, each queue 602 comprises a plurality of entries 605, and has an associated write (W) pointer 603 under control of procedure 201 of hub function 11 and a read (R) pointer 604 under control of the corresponding receiving process 103. Procedure 201 writes messages into queues 602. Receiving processes 103 retrieve messages from queues 602, each from its own corresponding queue 602. Also included among data structures and facilities 202 is the conventional UNIX system signals facility 600. It is a mechanism by which the operating system notifies processes of the occurrence of asynchronous events, e.g., traps and interrupts.

Figure 5:
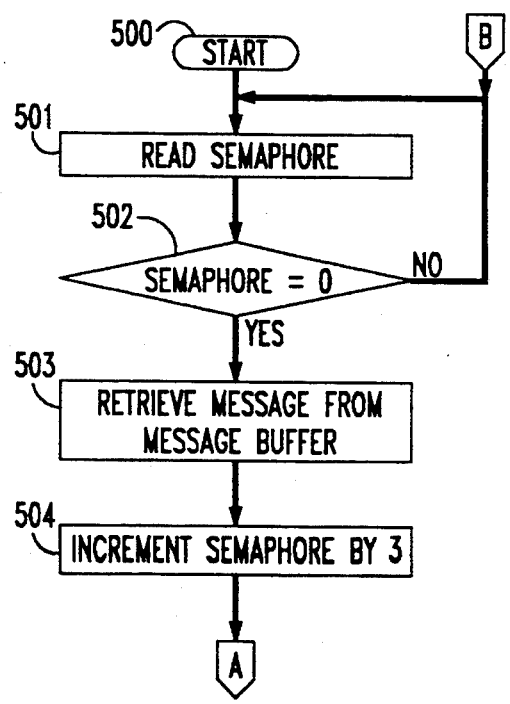
FIG. 5 is a flow diagram of a synchronous portion of a procedure of the hub function of the link of FIG. 2.
Figure 6:
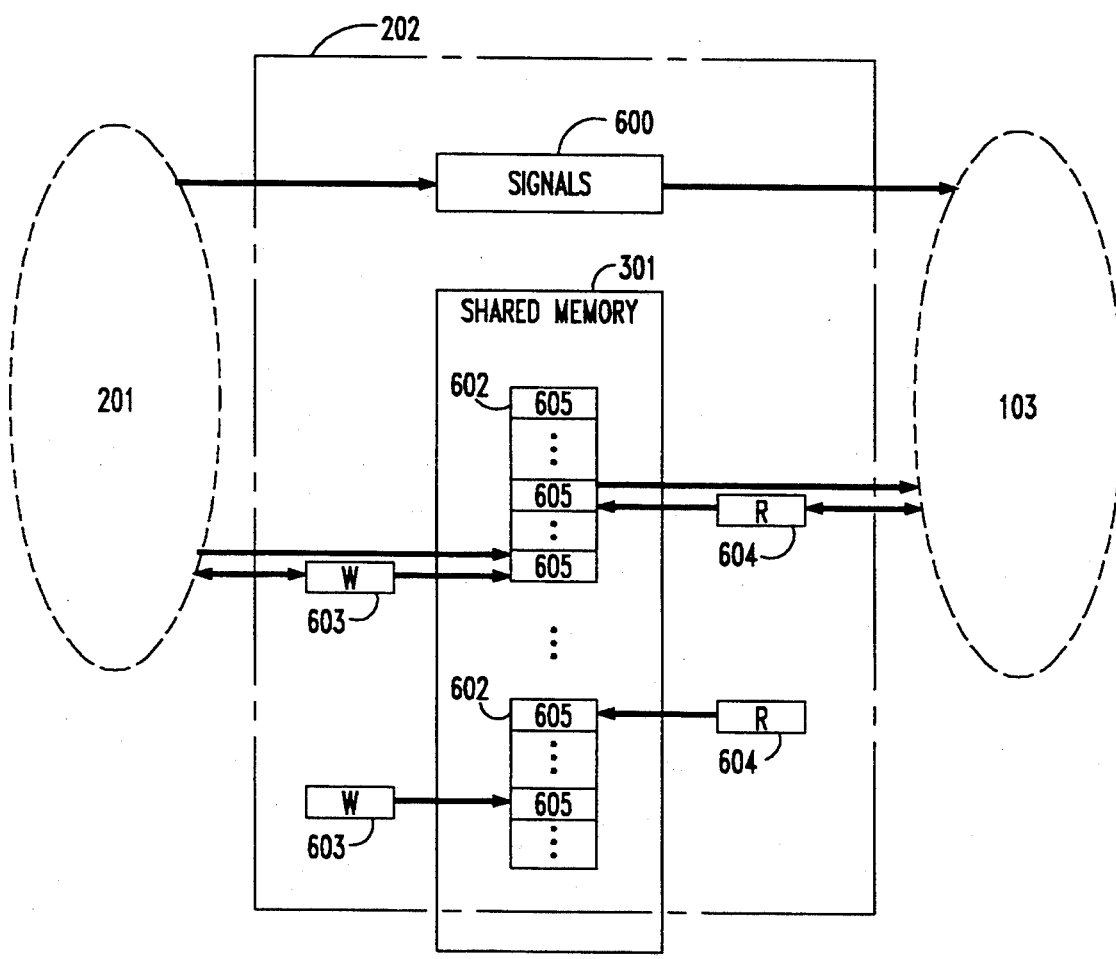
FIG. 6 is a block diagram of asynchronous data-structures-and-functions block of the hub function of the link of FIG. 2.
Figure 7:
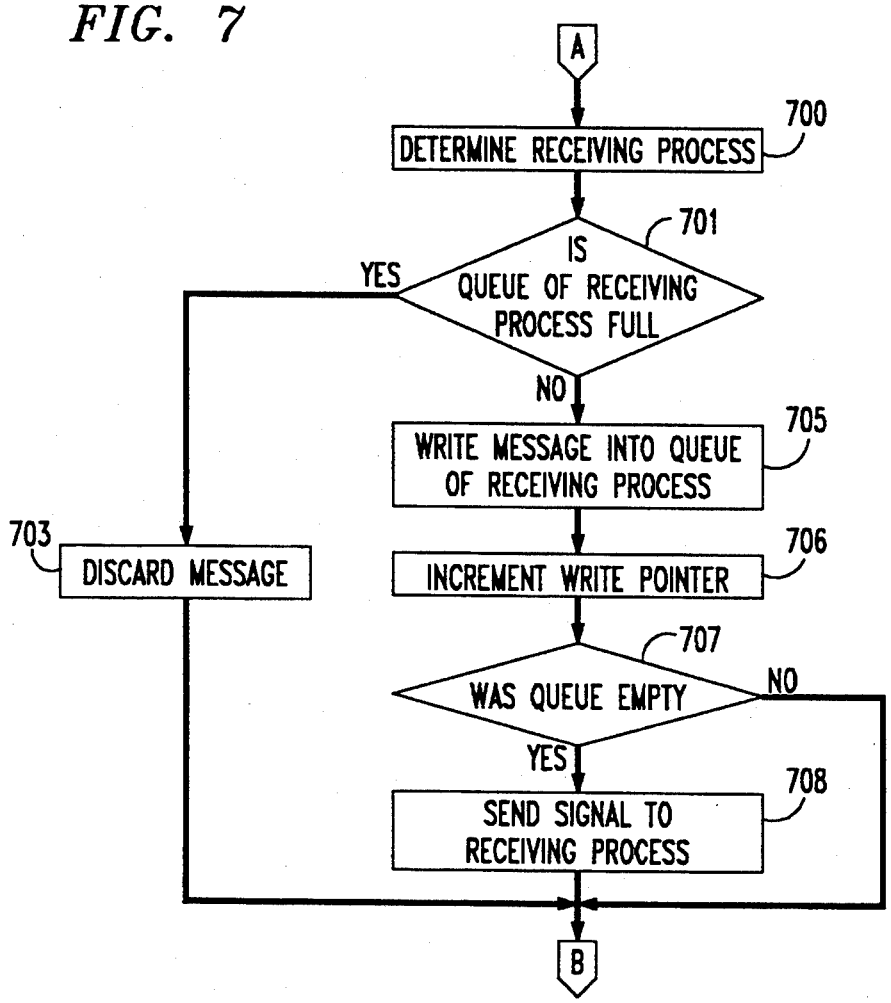
FIG. 7 is a flow diagram of an asynchronous portion of the procedure of the hub function of the link of FIG. 2.

After it retrieves a message from message buffer 302 of FIG. 3, step 503 of in FIG. 5, procedure 201 determines from the message contents the identity of receiving process 103 to which the message is addressed, at step 700 of FIG. 7. Procedure 201 then checks the receiving process' corresponding queue 602 of FIG. 6 to determine if it is full, at step 701 of FIG. 7, in a conventional manner. If so, procedure 201 discards the message, at step 703, and then returns to step 501 of FIG. 5. It is not necessary to inform sending process 100 of the failure to deliver the message, because a datagram protocol is being used which does not guarantee message delivery. Under a datagram protocol convention, message retransmission is the responsibility of the application.

If procedure 201 determines at step 701 of FIG. 7 that queue 602 of FIG. 6 of receiving process 103 is not full, it writes the retrieved message into an entry 605 of that queue 602 which is pointed to by that queue's associated W pointer 603, at step 705, and increments W pointer 603, at step 706. Procedure 201 then checks whether this is the only message in that queue 602, i.e., whether that queue 602 had been empty, at step 707, again in a conventional manner. If so, procedure 201 causes signals facility 600 to send a signal to receiving process 103 to inform it of presence of a message in its queue 602, at step 708. Procedure 201 then returns to step 501 of FIG. 5.

Figure 8:
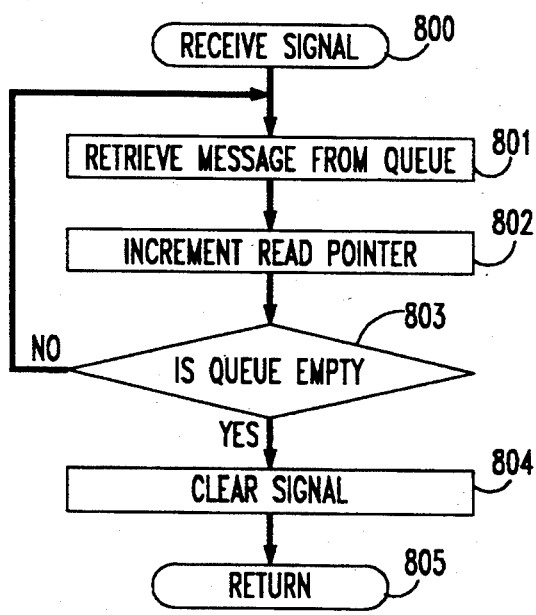
FIG. 8 is a flow diagram of an asynchronous procedure of a receiving process of the link of FIG. 2.

In response to receiving a signal that was caused by procedure 201 to be sent at step 708, receiving process 103 eventually executes the procedure of FIG. 8, with respect to the data structures and facilities 202 of FIG. 6 Upon its invocation, at step 800, the procedure accesses the process' corresponding queue 602 and retrieves a message from entry 605 pointed to by that queue's R pointer 604, at step 801. The procedure also increments R pointer 604, at step 802. The procedure then checks whether that queue 602 is empty, at step 803, in a conventional manner. If not, the procedure returns to step 801 to retrieve another message from that queue 602. But if queue 602 is now empty, the procedure clears the signal that caused its invocation, at step 804, and then returns to the point of its invocation, at step 805. The inter-process communication between sending and receiving processes is thus completed.

Of course, it should be understood that various changes and modifications to the illustrative embodiment described above will be apparent to those skilled in the art. For example, a wide range of inter-processor communications schemes may be used—the described technique is independent of the inter processor communications mechanism. Also, the multi-processor may be implemented as a single machine within a common cabinet, or it may be a network of discrete machines. Furthermore, different queueing data structures other than circular buffers may be used. Further yet, a UNIX inter-process message facility may be substituted for semaphores or shared memory. Such changes and modifications can be made without departing from the spirit and the scope of the invention and without diminishing its attendant advantages. It is therefore intended that all such changes and modifications be covered by the following claims.

I claim:

1. An inter-process communications arrangement comprising:
    a synchronous communications path segment for communicating with a first process of a pair of communicating processes within a single processor, including
        a shared-memory message buffer for temporarily storing a message being communicated from the first process, and
        a semaphore means for creating a critical region around the shared-memory message buffer while a message is being stored into and retrieved from the shared-memory message buffer;
    an asynchronous communications path segment for communicating with a second process of the pair, including
        a shared-memory message queue for temporarily storing the message being communicated to the second process, having a read pointer indicating from where in the shared-memory message queue is to be retrieved the message being communicated to the second process and a write pointer indicating where in the shared-memory message queue is to be stored the message being communicated to the second process, and
        a signals means for giving notice of presence of the message in the shared-memory message queue; and
    means for interconnecting the synchronous and the asynchronous communications path segments to form a communications path extending between the processes of the pair, including
        means for transferring the message being communicated from the first process from the shared-memory message buffer into the shared-memory message queue.

2. The arrangement of claim 1 CHARACTERIZED IN THAT the arrangement is implemented using UNIX system facilities in a UNIX system operating environment.

3. The arrangement of claim 1 wherein:
    the message buffer is for use by a plurality of message-sending processes;
    the semaphore is associated with the message buffer to control access to the message buffer and has three possible states;
    the synchronous communications path segment further includes
        operative means associated with the first process for performing a first operation on the semaphore when the semaphore is in a first state indicating that the buffer is available for use by the message-sending processes to place the semaphore in a second state thereby reserving the message buffer for exclusive use by the first process, and responsive to the reservation for storing the message in the message buffer and performing a second operation on the semaphore to place the semaphore in a third state thereby freeing the message buffer for use by the interconnecting means; and
    the means for transferring include
        operative means responsive to the semaphore being in the third state for retrieving the stored message from the message buffer and performing a third operation on the semaphore to place the semaphore in the first state.

4. The arrangement of claim 1 wherein:
    the shared-memory message queue includes
        a plurality of message buffers each associated with a different message-receiving process;
    the signals means include
        means for sending a signal to a selected message-receiving process
    the asynchronous communications path segment further includes
        operative means associated with the second process and responsive to receipt of the signal from the signal-sending means for retrieving the stored message from the one of the message buffers associated with the second process; and
    the means for transferring include
        operative means for storing a received message in the one of the message buffers associated with the second process and causing the signal-sending means to send the signal to the second process.

5. The arrangement of claim 1 wherein:
    the message buffer is for use by a plurality of message-sending processes;
    the semaphore is associated with the message buffer to control access to the message buffer and has three possible states;
    the synchronous communications path segment further includes
        first operative means associated with the first process for performing a first operation on the semaphore when the semaphore is in a first state indicating that the buffer is available for use by the message-sending processes to place the semaphore in a second state thereby reserving the message buffer for exclusive use by the first process, and responsive to the reservation for storing the message in the message buffer and performing a second operation on the semaphore to place the semaphore in a third state thereby freeing the message buffer for use by the interconnecting means;
    the means for transferring include
        second operative means responsive to the semaphore being in the third state for retrieving the stored message from the message buffer and performing a third operation on the semaphore to place the semaphore in the first state;
    the shared-memory message queue includes
        a plurality of message buffers each associated with a different message-receiving process;
    the signals means include
        means for sending a signal to a selected message-receiving process;
    the asynchronous communications path segment further includes third operative means associated with the second process and responsive to receipt of the signal from the signal-sending means for retrieving the stored message from the one of the message buffers associated with the second process; and the means for transferring further include fourth operative means responsive to retrieval of the message by the second operative means for storing the retrieved message in the one of the message buffers associated with the second process and causing the signal-sending means to send the signal to the second process.

6. The arrangement of claim 5 CHARACTERIZED IN THAT the arrangement is implemented using UNIX system facilities in a UNIX system operating environment.

7. An inter-process communications method comprising the steps of:

synchronously communicating with a first process of a pair of communicating processes within a single processor to receive a communication froM the first process for a second process of the pair, including the steps of creating a critical region around a shared-memory message buffer via a semaphore facility, the first process storing the communication in the shared-memory message buffer, and a communications interconnection arrangement retrieving the communication from the shared-memory message buffer; and in response to receipt of the communication, asynchronously communicating with the second process to transfer the received communication to the second process, including the steps of the communications interconnection arrangement storing the retrieved communication at a place in a shared-memory message queue indicated by a write pointer of the shared-memory message queue, indicating presence of the communication in the shared-memory message queue to the second process via a signals facility, and the second process retrieving the communication from the place in the shared-memory message queue indicated by a read pointer of the shared-memory message queue.

8. The method of claim 7 CHARACTERIZED IN THAT the method is implemented using UNIX system facilities in a UNIX system operating environment.

9. The method of claim 7 wherein the step of creating the critical region comprises the steps of:

in response to the first process having a message to send, performing a first operation on behalf of the first process, on a semaphore that controls access to the message buffer which is shared by a plurality of message-sending processes, when the semaphore is in a first state indicating that the message buffer is available for use by the message-sending processes, to place the semaphore in a second state and thereby reserving the message buffer for exclusive use by the first process;

the step of the first process storing comprises the step of in response to the reservation, storing the message in the message buffer;

the step of creating the critical region comprises the further step of in response to the storing, performing a second operation on the semaphore to place the semaphore in a third state, thereby making contents of the message buffer available for transfer to a receiving process;

the step of the communications interconnection arrangement retrieving comprises the step of in response to the semaphore being in the third state, retrieving the stored message from the message buffer; and the step of creating the critical region comprises the further step of in response to the retrieving, performing a third operation on the semaphore to place the semaphore in the first state.

10. The method of claim 7 wherein the step of the communications interconnection arrangement storing comprises the step of storing a message in one of a plurality of message buffers, each associated with a different message-receiving process, the one message buffer being associated with the second process, at a place in the one message buffer indicated by a write pointer of the one message buffer;

the step of indicating presence comprises the step of in response to the storing, causing a signal to be sent to the second process; and the step of the second process retrieving comprises the step of in response to receipt of the sent signal, retrieving the stored message from the one message buffer on behalf of the second process, from the place in the one message buffer indicated by a read pointer of the one message buffer.

11. The method of claim 7 wherein:

the step of creating the critical region comprises the step of in response to the first process having the message to send, performing a first operation on behalf of the first process, on a semaphore that controls access to the message buffer which is shared by a plurality of message-sending processes, when the semaphore is in a first state indicating that the message buffer is available for use by the message-sending processes, to place the semaphore in a second state and thereby reserving the message buffer for exclusive use by the first process;

the step of the first process storing comprises the step of in response to the reservation, storing the message in the message buffer;

the step of creating the critical region comprises the further step of in response to the storing, performing a second operation on the semaphore to place the semaphore in a third state, thereby making contents of the message buffer available for transfer to a receiving process;

the step of the communications interconnection arrangement retrieving comprises the step of in response to the semaphore being in the third state, retrieving the stored message from the message buffer;

the step of creating the critical region comprises the further step of in response to the retrieving, performing a third operation on the semaphore to place the semaphore in the first state;

the step of the communications interconnection arrangement storing comprises the step of storing the retrieved message in one of a plurality of message buffers, each associated with a different message-receiving process, the one message buffer being associated with the second process, at a place in the one message buffer indicated by a write pointer of the one message buffer;

the step of indicating presence comprises the step of in response to the storing, causing a signal to be sent to the second process; and the step of the second process retrieving comprises the step of in response to receipt of the sent signal, retrieving the stored message from the one message buffer on behalf of the second process, from the place in the one message buffer indicated by a read pointer of the one message buffer.

12. The method of claim 11 CHARACTERIZED IN THAT the method is implemented using UNIX system facilities in a UNIX system operating environment.

* * * * *